No. 666,241.  
A. BARRACLOUGH.  
TIN LINED LEAD PIPE.  
(Application filed Dec. 27, 1897.)  
Patented Jan. 15, 1901.
(No Model.)
FIG. 1.
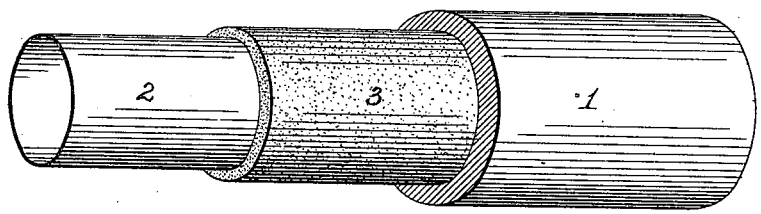
FIG. 2.     FIG. 3.
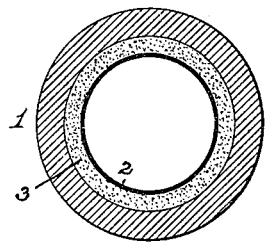 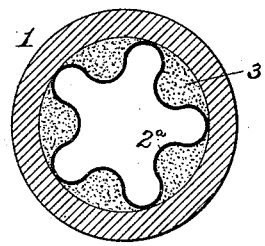
FIG. 4.
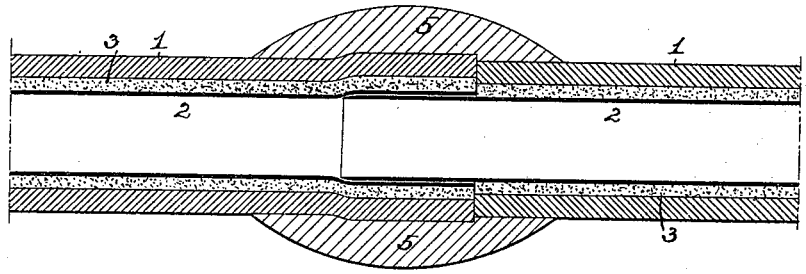
Witnesses:  
Charles De Cow.  
F. E. Bechtold.
Inventor:  
Albert Barraclough  
by his Attorneys,

UNITED STATES PATENT OFFICE.

ALBERT BARRACLOUGH, OF HECKMONDWIKE, ENGLAND, ASSIGNOR OF FIVE-EIGHTHS TO HARRY HARDWICK, OF PHILADELPHIA, PENNSYLVANIA.

TIN-LINED LEAD PIPE.

SPECIFICATION forming part of Letters Patent No. 666,241, dated January 15, 1901.

Application filed December 27, 1897. Serial No. 663,635. (No model.)

*To all whom it may concern:*

Be it known that I, ALBERT BARRACLOUGH, a subject of the Queen of Great Britain and Ireland, and a resident of Heckmondwike, county of York, England, have invented certain Improvements in Tin-Lined Lead Pipes, of which the following is a specification.

One object of my invention is to so construct a tin-lined lead pipe as to prevent contact of the tin with the lead, a further object being to provide for the expansion of the tin lining independently of the lead pipe, and a still further object being to provide a simple and efficient joint for tin-lined lead pipes. These objects I attain in the manner hereinafter set forth, reference being had to the accompanying drawings, in which—

Figure 1 is a perspective view of a piece of tin-lined lead pipe constructed in accordance with my invention. Fig. 2 is a transverse section of the pipe. Fig. 3 is a transverse section of a special form of pipe embodying my invention, and Fig. 4 is a longitudinal section of a joint for tin-lined lead pipes constructed in accordance with my invention.

In that class of tin-lined lead pipes in which the tin lining is in direct contact with the lead chemical action sometimes occurs, which injures the tin lining. I therefore interpose between the lead pipe 1 and the tin lining 2 a non-metallic body 3, which will prevent contact of the tin lining with the lead pipe, and thus overcome the objectionable action referred to. This interposed non-metallic body may consist of any ordinary form of cement composition introduced either by pouring it into the space between the pipe and lining or by forcing it into said space by means of a suitable pump or drawing it in by first inducing a partial vacuum in said space, the concentricity of the pipe and lining being insured by wrapping spirally around said lining twine, asbestos, yarn, wire, or other equivalent material, or it may be preferable in some cases to use as the interposed body some elastic or semi-elastic material which will permit of a limited amount of contraction of the pipe 1 or expansion of the lining 2 without the one affecting the other. The interposed medium is also by preference of such character that it will serve as a non-conductor of heat, so as to prevent loss of heat by radiation in case the pipe is intended for conveyance of heated liquids or, on the other hand, to prevent freezing of the contents of the pipe in cold weather.

The non-metallic body is applied to the tin pipe by wrapping or covering the latter therewith in any suitable way, the covered tin pipe being then inserted into the lead pipe and secured therein by contracting said lead pipe by external pressure applied thereto, the ductility of the lead pipe permitting such contraction of the same.

When the pipe is intended for use in exposed situations, I prefer to corrugate the tin lining, as shown in Fig. 3, so that it is free to expand within certain limits without exerting undue pressure upon the containing-pipe.

In joining together pipes constructed in accordance with my invention I prefer to adopt the plan shown in Fig. 4, on reference to which it will be observed that one pipe has the lead covering and interposed body stripped from the tin lining for a short distance back from the end of the latter, which is preferably beveled or skived to a feather-edge, as shown. The end of the other pipe is expanded slightly, so that the exposed projecting end of the tin lining can enter the same, the degree of expansion being preferably such that the tin linings will fit snugly one to the other, the ends of the lead pipes and interposed bodies abutting against each other. After this has been effected a solder or wipe joint 5 is formed over the meeting ends of the pipes in the same manner as in forming such joints on ordinary lead pipes.

Having thus described my invention, I claim and desire to secure by Letters Patent—

1. A tin-lined lead pipe having a non-metallic body interposed between the pipe and the lining, so as to prevent contact of the two, said interposed body being held in compressed condition upon the lining by the ductile lead pipe, substantially as specified.

2. The mode herein described of producing a tin-lined lead pipe, said mode consisting in first applying to the tin pipe a non-metallic covering, then inserting said covered pipe in the lead pipe, and then compressing the latter upon the covering of the tin pipe by pressure externally applied to the lead pipe, substantially as specified.

3. A tin-lined lead pipe having interposed between the pipe and lining a non-metallic body which is a non-conductor of heat, substantially as specified.

4. A tin-lined lead pipe having the lining corrugated and having a non-metallic body interposed between the pipe and lining, substantially as specified.

5. A joint for tin-lined lead pipes in which the tin lining of one pipe projects into the expanded tin lining of an adjoining pipe, substantially as specified.

In testimony whereof I have signed my name to this specification in the presence of two subscribing witnesses.

ALBERT BARRACLOUGH.

Witnesses:
HERBERT MELLOR,
GEORGE R. BUCKLEY.